United States Patent
Viljoen et al.

(10) Patent No.: US 7,191,327 B2
(45) Date of Patent: Mar. 13, 2007

(54) INTERNET-ENABLED DEVICE PROVISIONING, UPGRADE AND RECOVERY MECHANISM

(75) Inventors: André Francois Viljoen, North Vancouver (CA); Pieter Bernardus Truter, North Vancouver (CA)

(73) Assignee: Intrinsyc Software International, Inc. (CA)

( * ) Notice: Subject to any disclaimer, the term of this patent is extended or adjusted under 35 U.S.C. 154(b) by 487 days.

(21) Appl. No.: 10/406,205

(22) Filed: Apr. 4, 2003

(65) Prior Publication Data

US 2003/0191930 A1  Oct. 9, 2003

(30) Foreign Application Priority Data

Apr. 4, 2002  (CA) ..................................... 2380762

(51) Int. Cl.
G06F 9/24 (2006.01)
G06F 15/177 (2006.01)
G06F 15/163 (2006.01)
H04L 9/14 (2006.01)

(52) U.S. Cl. ............................. 713/2; 713/1; 713/100; 713/176; 709/217

(58) Field of Classification Search ..................... None
See application file for complete search history.

(56) References Cited

U.S. PATENT DOCUMENTS

| | | | |
|---|---|---|---|
| 5,940,627 A | 8/1999 | Luciani et al. | |
| 6,079,016 A | 6/2000 | Park | |
| 6,151,674 A * | 11/2000 | Takatani | 713/2 |
| 6,178,503 B1 | 1/2001 | Madden et al. | |
| 6,295,603 B1 | 9/2001 | Mischo | |
| 6,463,535 B1 * | 10/2002 | Drews | 713/176 |
| 6,591,376 B1 * | 7/2003 | VanRooven et al. | 713/2 |
| 6,598,159 B1 * | 7/2003 | McAlister et al. | 713/2 |
| 6,732,159 B1 * | 5/2004 | Levine et al. | 709/217 |
| 6,763,457 B1 * | 7/2004 | Aguilar et al. | 713/2 |
| 6,957,328 B2 * | 10/2005 | Goodman et al. | 713/2 |
| 2001/0016879 A1 | 8/2001 | Sekiguchi et al. | |
| 2001/0036109 A1 | 11/2001 | Jha et al. | |
| 2003/0028800 A1 * | 2/2003 | Dayan et al. | 713/200 |

OTHER PUBLICATIONS

"Computer Dictionary", 1994, Microsoft Press, Second Edition, p. 350.*
Comer, Douglas E., "Computer Networks and Internets", 1999, Prentice-Hall, Inc., p. 412.*
Stevens, W. Richard, "TCP/IP Illustrated, vol. 1—The Protocols", 1994, Addison Wesley, pp. 209-213.*
http://www.intel.com/support/network/adapter/pro100/bootagent/userguide/btagnt1.htm.
http://developer.axis.com/doc/software/tools/network_boot.html.
http://netboot.sourceforge.net/english/introduction.html.

* cited by examiner

Primary Examiner—James K. Trujillo
(74) Attorney, Agent, or Firm—Vermette & Co.

(57) ABSTRACT

The invention consists of a boot loader for a device, comprising an IP stack supporting Internet protocols, and a scripting engine to run a default script. The IP stack includes address discovery service (for example, BOOTP and DHCP), a URI to IP address translator (for example, DNS), and a protocol for file transfer over the Internet (for example, HTTP, FTP and/or TFTP). On start-up of the device, the boot loader runs the default script to initialize the device and verify the integrity of any data and operating systems in memory on the device.

21 Claims, 5 Drawing Sheets

| PARTITION TABLE VERSION | |
|---|---|
| PARTITION TABLE CHECKSUM | |
| ACTIVE PARTITION (0 = NO BOOT IMAGE) | UPDATE FLAG |
| PARTITION HEADER SCRIPT URI | |

FIG. 6

| IMAGE CHECKSUM | | | |
|---|---|---|---|
| START FLASH BLOCK OF IMAGE | | | |
| NUMBER OF FLASH BLOCKS USED BY IMAGE | | | |
| PARTITION TYPE | PARTITION PERMISSIONS | IN PLACE FLAG | |
| IMAGE VERSION (MAJOR) | IMAGE VERSION (MINOR) | IMAGE VERSION (BUILD VERSION) | IMAGE VERSION (BUILD VERSION) |
| IMAGE LOAD ADDRESS IN RAM | | | |
| SIZE OF IMAGE IN BYTES | | | |
| NEXT PARTITION BLOCK (0 = NO MORE BLOCKS) | | | |
| PARAMETERS | | | |
| PARTITION ENTRY SCRIPT URI | | | |

FIG. 7

INTERNET-ENABLED DEVICE PROVISIONING, UPGRADE AND RECOVERY MECHANISM

FIELD

The invention relates to a boot loader designed to access boot information via the Internet, allowing for automatic provisioning, upgrades and recovery of corrupted device images based on a unique device ID.

BACKGROUND

Most desktop computers and similar devices have a boot loader. The function of the boot loader is to load an operating system into the computer's main memory or random access memory (RAM). Once the operating system is loaded (for example, on a PC, when you see the initial Windows or Mac desktop screen), it is ready for users to run applications.

The boot loader is a small program that loads the operating system into the computer. Furthermore, a boot loader can give the user the choice to load an operating system from a list of available operating systems. This would be done by creating partitions in the Flash memory, hard disk or Read Only Memory (ROM). Each partition would include a single operating system or user data. During the booting process the user would be prompted to select from the list of available operating systems. Once the choice is made, the boot loader proceeds to load the desired operating system into RAM and then hand control to the operating system.

Embedded devices such as Personal Digital Assistants (PDAs) and mobile phones are being widely adopted in everyday life. Embedded computers are also built into appliances such as microwave ovens and used extensively in industrial control. The manufacturers of these devices have to sell devices where a wide variety of hardware and software is available on the device. The consumers of these devices can be largely non-technical people with no knowledge of how to fix or modify these devices if need be. There might be thousands of these devices that need the same software or upgrades.

In the past, when a device is corrupted or the software needs to be replaced, the customer is expected to send it back to the manufacturer for repair. Repair might take weeks or months. There is a need for a system that will allow the user to get immediate repair of a corrupted device or updates to an outdated device with very little effort or knowledge.

It is an object of this invention to provide a boot loader with standard Internet protocols (HTTP, TFTP, FTP) to allow the disassociation of the software and hardware at the manufacturing time. The boot loader should maintain all the functionality of a traditional boot loader as described above, such as partition of the device's memory in order to facilitate the loading of multiple operating systems. Additionally, the boot loader should allow for the device image (partition) to be loaded using Internet protocols.

It is a further object of this invention to provide a boot loader that allows a device to have disaster recovery features. Whenever a virus, or any other factor corrupts the device, it will automatically attempt to restore itself to a working state via the boot loader.

It is a still further object of this invention to provide a boot loader that allows a device to automatically update software running on, or data required by the device whenever an update is available.

It is a still further object of this invention to provide a boot loader that is operated by a simple scripting language that instructs a device to check for an update of data on a periodic basis. The scripting language may also include instructions to download further scripts off the Internet that augment the execution of the script.

SUMMARY

The invention consists of a boot loader for a device, comprising an IP stack supporting Internet protocols, and a scripting engine to run a default script. The IP stack includes address discovery service (for example, BOOTP and DHCP), a URL to IP address translator (for example, DNS), and a protocol for file transfer over the Internet (for example, HTTP, FTP and/or TFTP). On start-up of the device, the boot loader runs the default script to initialize the device and verify the integrity of any data and operating systems in memory on the device.

Preferably, the default script generates and verifies a primary partition table and a secondary partition table in memory on the device, the partition tables being identical in content. The content of the partition tables is partition metadata describing one or more partitions in memory on the device. The initialization further includes generating and verifying the partitions in memory on the device using the partition metadata.

On start-up of the device, the boot loader will attempt to go through the redundant partition tables and check if they are valid. If no partition tables exist or the update flag is set, the boot loader will retrieve the unique ID of the device and use the recovery script to create the partition tables. The script might instruct the boot loader to download scripts and/or data from a server on the Internet.

If one of the partition tables is invalid then the boot loader will attempt to recover the partition table contents using the redundant copy of the partition tables.

This process may be streamlined by the use of prepared device profiles and scripts located on the remote web server.

After validating the partition tables, the boot loader loads and runs a start-up script.

The start-up script may instruct the boot loader to check for updated versions of software present on the server, either at start-up, or at set intervals. The boot loader may further use the same mechanism to repair or replace corrupted software on the device.

Additionally, the boot loader can support memory partition, to allow for multiple operating systems on a single device.

The invention also comprises the method of using the above boot loader for loading a device image into an Internet-connected device.

BRIEF DESCRIPTION OF THE DRAWINGS

The invention itself both as to organization and method of operation, as well as additional objects and advantages thereof, will become readily apparent from the following detailed description when read in connection with the accompanying drawings.

DETAILED DESCRIPTION

In the following description, a "device image" means an executable operating system and/or data required for proper operation of a device. A device image may contain file systems or plain data, as required.

A "device unique ID" is a serial number or string that unique identifies a device from any other device. The device unique ID must be stored in a non-volatile manner and allow for easy retrieval at any time. Frequently, the MAC address is used as a device unique ID, however, any number or string that meets the requirements will suffice. A MAC (Media Access Control) address is a computer's unique hardware number. Ethernet MAC addresses are unique and are administered and distributed by the IEEE.

Figure 1:
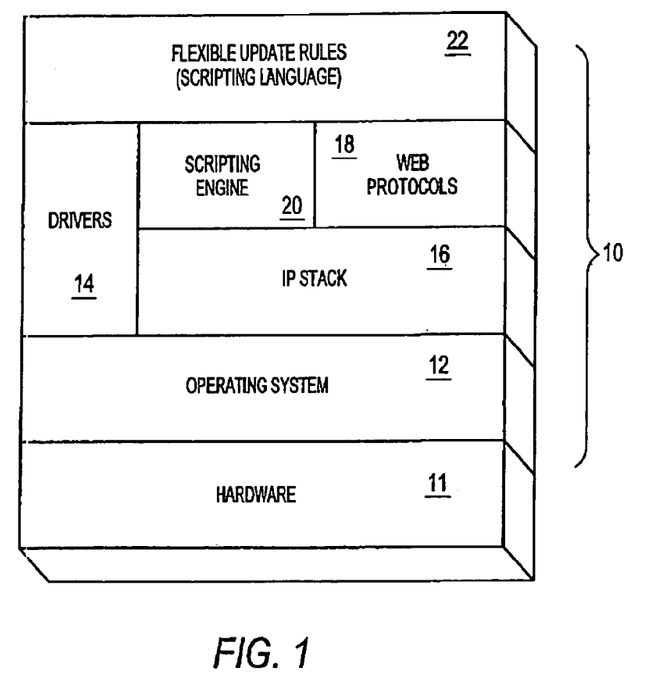
FIG. 1 is a block diagram of the architectural components of a boot loader according to the present invention.

FIG. 1 shows the architectural components of a boot loader 10 according to the present invention. The components of the boot loader 10 are installed onto a hardware platform 11. Each of the components is described in detail below.

The Operating System 12 supports a wide variety of potential peripheral device drivers 14 including Ethernet, 802.11 WiFi, USB and Serial.

The Operating System 12 can also include a User Interface (UI) designed to be accessible through serial or network interfaces, LCD touch screens, or any other input method as required. The UI contains an extensible lexical analyzer for parsing regular expressions in the input stream. The lexical analyzer should be extensible to allow for understanding of complex UI commands as needed.

The IP stack 16 provides the essential support for high-level protocols and services 18 to allow successful communication over the Internet. These may include BOOTP and DHCP for address discovery, a DNS resolver to translate URLs to IP addresses and HTTP, FTP and TFTP for downloading images over the Internet.

The IP stack 16 also supports a scripting engine 20, which runs scripts written in a scripting language 22. The scripts contain the logic used by the boot loader 10 upon start-up of the hardware 11.

The scripting language 22 provides the functionality for implementing the different desired recovery and update scenarios. The scripting language should be extensible via scripts on a server that contains various device profiles. The device profiles are selected on the server based on the unique ID of the device. This allows changes to the device image to be made according to data stored on a server, without user interaction or modification of the boot loader 10 on the device.

An example of the typical constructs in the scripting language 22 is set forth below. Obviously, commands and syntax can be freely modified to achieve the same effect or to create additional effects.

Variables
VARIABLE=expression
  Assign a value to a variable.

Conditional Execution
IF (expression) ELSE ENDIF
  Conditionally execute commands. Used in scripting.

PRINT—Console Output
PRINT expression
  Print an expression on the console without CR/LF at the end.
PRINTLN expression
  Print an expression on the console with CR/LF at the end FLASH—Copy Memory to Flash
FLASH start source bytes
  Copy an image to the start address in flash memory from any other memory location for the number of bytes indicated.

LOCK—Lock Flash Memory
LOCK
  Lock the selected partitions flash memory.
LOCK partition
  Lock the indicated partitions flash memory.
LOCK Start Length
  Lock a range of memory in flash from Start for length bytes.

UNLOCK—Unlock Flash Memory
UNLOCK
  Unlocks the selected partitions flash memory.
UNLOCK partition
  Unlocks the indicated partitions flash memory.
UNLOCK Start Length
  Unlocks a range of memory in flash from Start for length bytes.

ERASE—Erase Flash Memory
ERASE
  Erase the selected partitions flash memory.
ERASE partition
  Erase the indicated partitions flash memory.
ERASE Start Length
  Erase a range of memory in flash from Start for length bytes.

Modify Partition Entry
CHAIN partition
  Chain partitions to the selected partition.
UNCHAIN
  Unchain all partitions from the selected partition.
PERMISSION=RO/RW
  Change the permissions of the selected partition to RO (Read Only) or RW (Read/Write)
RELOCATE=YES/NO
  Set the relocation flag for the selected partition. If selected, this partition will be copied to RAM before execution.
LOADADDRESS=entry
  Set the entry point for the selected partition.
PARAMETERS=STRING
  Set the kernel parameters for the selected partition. The parameters will be passed to the kernel when it is executed.
TYPE=ImageType
  Set the image type to one of the following supported types: JFFS/CE/LINUX/RAMDISK/BOOTLOADER
SOURCE=STRING
  Set the origin of the selected partition. This URL or filename will be used to download the image.

Manage Partition Entry.
CREATE Start Length
  Create a new partition in flash memory from the Start block indicated for the number of blocks indicated by the Length parameter. This will also select this partition for further partition manipulation.
DELETE partition Delete the partition and make it's space available for reuse.

SELECT partition
Select the partition for further partition manipulation.

ACTIVE partition
Set the partition as the Active partition. This partition will be automatically used at the next reboot.

UPDATE partition
Download the image of the partition from its origin and copy it to flash using the information stored in the partition Meta data.

UPDATE
Download the image of the selected partition from its origin and copy it to flash using the information stored in the partition Meta data.

SAVE
Save the modifications made to the partition table.

DISPLAY partition
Display all the Meta data related to the partition.

LIST
List the contents of the partition table in table form.

DOWNLOAD IP Name
Download a file using the TFTP at IP. Upon successful completion the address and length where the file is stored will be printed on the console. The variables 'start' and 'length' will also be set to the appropriate values.

DOWNLOAD Name/URL
Download a file using the default TFTP server or use HTTP if a valid URL is entered. Upon successful completion the address and length where the file is stored will be printed on the console. The variables 'start' and 'length' will also be set to the appropriate values.

Memory Manipulation

DUMP Start Length
Display the contents of memory from Start for Length bytes.

COPY Dest Source Length
Copy memory from Source to Dest(ination) for Length bytes.

General

INFO
Display hardware and network configuration.

RESTORE=URL
Set the restore URL. This is the URL that will be used to download a script to configure the board.

SERVER=IP
Set the default TFTP server IP address.

HOST=IP
Set the IP address of the board manually. This will only be used if DHCP is not available.

DNS1=IP
Set the IP address of the Primary DNS server manually. This will only be used if DHCP is not available.

DNS2=IP
Set the IP address of the Secondary DNS server manually. This will only be used if DHCP is not available.

CODE
This variable is always set to the return value of the last command executed.

EXEC IP Filename
Download and execute the script using the specified TFTP server.

EXEC Filename/URL
Download and execute the script using the default TFTP server or use HTTP if a valid URL is entered.

BOOT partition parameter
Boot the image stored in the indicated partition and pass the parameter string in as an argument.

BOOT partition
Boot the image stored in the indicated partition.

BOOT parameter
Boot the image stored in the active partition and pass the parameter string in as an argument.

BOOT
Boot the image stored in the active partition.

VERSION
Return the current partition version number.

VALID
Return TRUE if the partition is calculated to be valid, return FALSE otherwise. The validity of a partition can be determined by calculating a checksum or CRC value.

UPDATEFLAG=Yes/No
Set the update flag to be either on or off.

The scripting language 22 can be extended to support other needs of the boot loader 10. For example, the script language 22 can include support for security protocols to allow for authentication of servers when downloading scripts and device images.

The server supports predetermined device profiles. A device profile is a collection of device images that define the behavior of a device. For example, device profile A might contain a StrongArm Linux kernel image and a file system image. Device profile B might contain a PXA250 kernel image and the same file system image. The server selects the device profile based on the unique device ID. This allows the boot loader 10 to synchronize the local device with its device profile on the web server for a robust and reliable connection.

Memory Partitioning

Memory (flash memory in most devices) is a single resource like an unformatted computer disk drive in a PC. Management is problematic since many users try to allocate sections for use in their applications. To manage the flash memory block in a consistent familial way, the same partitioning scheme used in a PC Disk Drives can be used with enhancements to accommodate flash memory. A partition table keeps track of all the allocated blocks in the flash memory. Only one active partition gets control when the system boots. The active partition can be set to any valid bootable partition.

Figure 2:
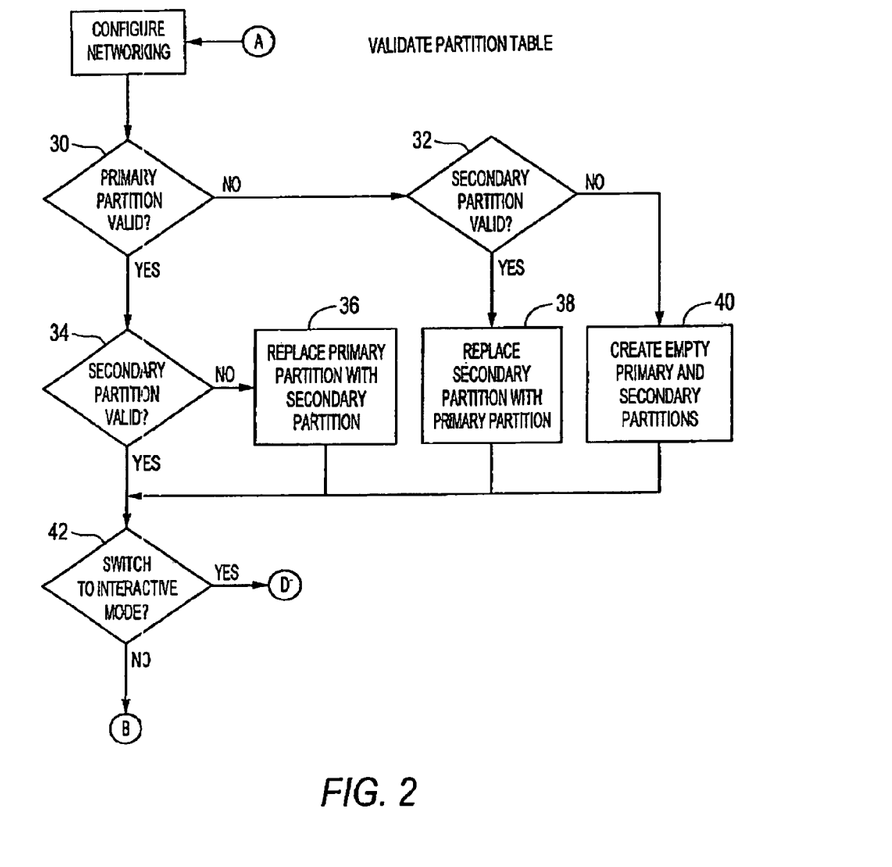
FIG. 2 is a flowchart for determining a valid boot partition.

Flash memory is very slow to update. It can take several seconds to write a block of data to Flash Memory. Therefore, during the write operation, there is a risk of events occurring that can put the Flash Block in an inconsistent state. To address this problem, the boot loader uses two partition tables: a Primary Partition Table (PPT) and a Secondary Partition Table (SPT). Both Partition Tables have a CRC field to check the validity of the Partition Table. The algorithm is shown in FIG. 2.

The following rules are used to make sure the flash memory stays consistent:
The PPT will always be used unless it is invalid. (step 30)
The SPT will be used if it is valid and the PPT is invalid (step 32).
If the PPT is invalid and the SPT is valid, the PPT will be replaced by the SPT. (step 38)
If the SPT is invalid and the PPT is valid, the SPT will be replaced by the PPT. (steps 34, 36)

If both PPT and SPT are invalid, both Partition Tables will be initialized to an empty state. (step 40)

Figure 6:
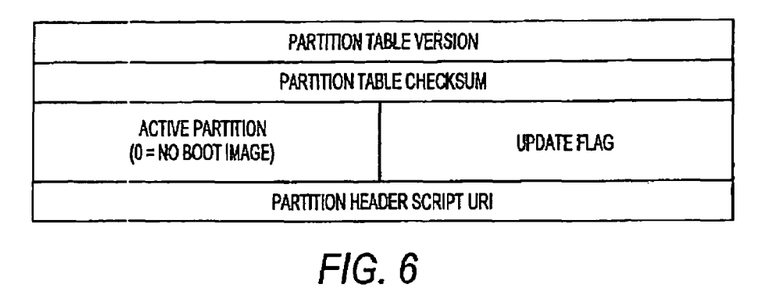
FIG. 6 is a table for a Partition Table Header Layout.

To accommodate everything that a boot loader can do with a partition, there needs to be some metadata information associated to it. This information will be stored in the Partition Table entry associated with the Partition. The structure of the header for the Partition Table entry is shown in FIG. 6. An example of this metadata is the very specific kernel parameters that must be passed to a Linux kernel at startup.

An operating system might consist of more than one type of Image. For example a typical Linux OS will need the following images:
Kernel Image
Root Ram disk Image
Flash File system Image.

Figure 7:
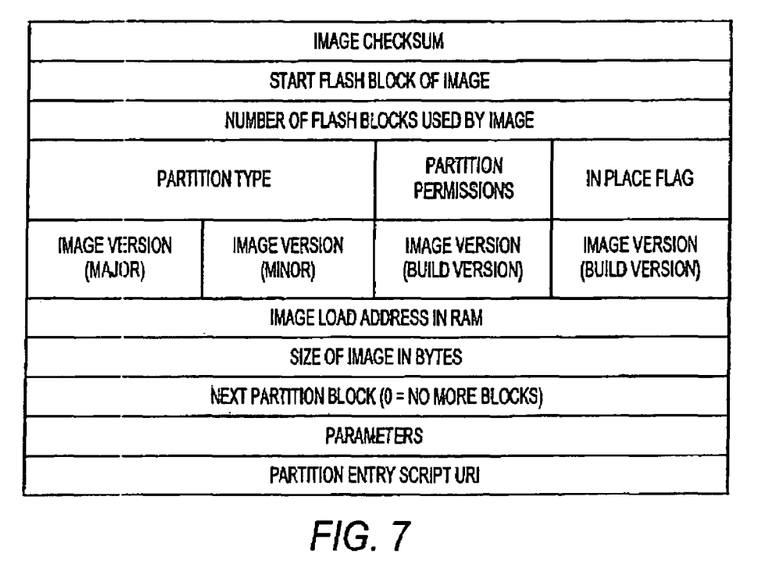
FIG. 7 is a table for a Partition Entry Layout.

To boot Linux, the Kernel Image and Root Ram disk Image must be moved into the system's RAM before the Kernel gets control. This is accomplished with Partition Table links originating from the Kernel's Partition Entry as shown in FIGS. 6 (Partition Header) and 7 (Partition Entry Layout).

Figure 3:
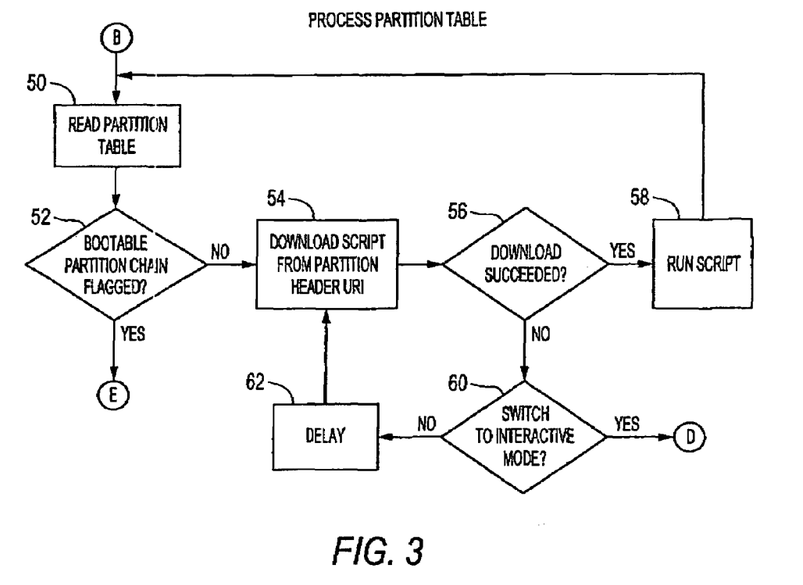
FIG. 3 is a flowchart of the partition table processing logic for a single partition.
Figure 4:
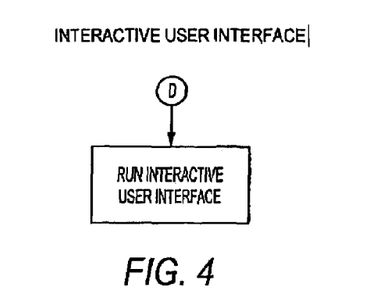
FIG. 4 is a flowchart of the user interface logic.

Definition of Metadata Terms Used in FIGS. 6 and 7:
Image Checksum:
  Calculated checksum of Stored Image.
Start Block:
  Start of Flash block containing Image
Number Of Blocks:
  Number of Flash blocks used by the data of a Partition (minimum=1).
Partition Type:
  Operating system (e.g. Linux, eCOS, Windows CE), file system (e.g. JFFS, ext2, RAMfs), etc.
Permissions:
  Read Only/Read-Write/Boot.
In place Flag:
  Indicates that image must be copied to RAM (See Load Address).
Version Info:
  Version number of the image.
Load Address:
  Start address in RAM that the image must be copied to.
Actual Size:
  Size of image in bytes.
Next partition:
  Next partition in the linked list of partitions. (0=end of the list).
Parameters:
  Image-specific parameters.

Where the boot loader differs from the conventional start-up process is at the boot record retrieval phase. Instead of searching for the boot programs on a diskette or hard drive, the boot loader searches the partitions in memory (shown in FIG. 2). Valid partitions are determined in accordance with the logic described in FIG. 2. Once the partitions are validated, the system either switches (step 42) to interactive mode, if a choice of OS is needed from the user (FIG. 4), or proceeds to the partition table processing steps (FIG. 3). FIG. 3 shows the start of the boot process, which may continue to FIG. 5 if chained partitions are processed.

The boot loader proceeds through the steps out in FIG. 3 to find a bootable partition. The partition table is read (step 50) and the table is checked for a bootable partition chain (step 52). If one is not present, a script is downloaded (steps 54, 56) from the URL specified in the partition header and run (step 58). If the download fails, the system will either (step 60) pass control to the user interface (FIG. 4) or re-attempt the download (step 54) after a short delay (step 62). Once a bootable partition is found, the boot loader will process all the chained partitions (FIG. 5) and then pass control to the first partition.

Figure 5:
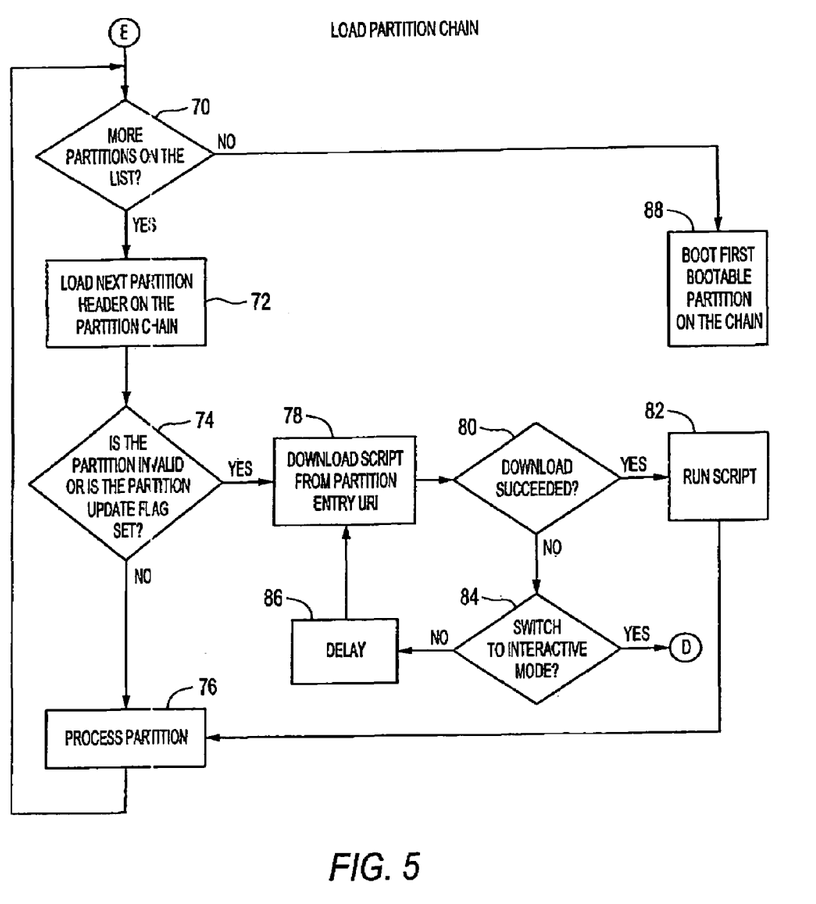
FIG. 5 is a flowchart of a partition chain update and a loading process for multiple partitions.

For a multiple partition device using a partition chain, each partition must be validated (or updated, as required) according to the steps in FIG. 5. First (step 70), the partition table is checked to see if any partitions remain on the list. If not, then the system boots the first bootable partition on the chain (step 88).

If partitions in remain, then the next partition header in the chain is loaded (step 72). The partition is checked to determine if the partition update flag is set or if the partition is invalid. If the partition is valid and the update flag is not set, the partition is processed (step 76) and the list in the partition table is checked for any remaining partitions (step 70). Otherwise the script for the partition entry must be downloaded (step 78) according to the URL inthe partition entry. After a successful download (step 80) the script is run (step 82) and the partition processed (step 76). If the download fails, the system will either (step 84) pass control to the user interface (FIG. 4) or re-attempt the download (step 78) after a shori delay (step 86).

The end result is that, either the first bootable partition is booted (FIG. 5, step 88), or the interactive user interface is run (FIG. 4) to allow the user to choose from multiple bootable partitions.

Definitions of Terms in FIGS. 2–5:
Configure Networking:
  This step includes setting up all the networking protocols and establishing networking connections making sure that they work.
Primary Partition Valid:
  Check the validity of the primary partition. The check can be performed in many ways, most commonly by Cyclic Redundancy Checking (CRC).
Switch to Interactive Mode:
  A check is performed to see if the user is interested in switching to command based interactive mode. This can be done by checking if any button is pressed or if the user is pressing a certain button on the keyboard.
Run Interactive User Interface:
  Bring up a command line on the display and allow the user to enter commands.
Read Partition Table:
  Process the partition table entries to view all metadata available in the table.
Bootable partition chain flagged:
  Check if the partition table metadata indicates that this partition is bootable.
Delay:
  Delay for a certain amount of time (i.e. 5 seconds), so as not to flood the processor.
Run Script:
  Execute all the commands in the script as described above.

In effect, on start-up, the boot loader uniquely identifies the device to the web server, over the Internet, processes the script commands from the web server according to the scripting language, and synchronizes the local device with the data (e.g. device profile) provided by the web server. The boot process then continues in the same fashion as a conventional boot loader, transparent to the user.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the scope of the invention.

We claim:

1. A boot loader for a device, comprising:
   a) a script engine operative to use a default script to initialize said device, to verify a primary partition table and a secondary partition table, identical in content to said primary partition table, in memory on said device, said content being partition metadata describing one or more partitions in memory on said device and said initializing further including generating and verifying said partitions in memory on said device using said partition metadata and including verifying the integrity of any data and operating systems in memory on said device;
   b) an IP stack containing an address discovery service, a URL to IP address translator and one or more Internet file transfer protocols that allows communication with a computer on a local or non-local network; and
   c) a boot loader operating system and drivers.

2. The bootloader according to claim 1, further comprising a user interface operative to allow a user to interrupt said default script.

3. The boot loader according to claim 1, wherein said default script can be replaced with a script downloaded from a remote server.

4. The boot loader according to claim 1, wherein said partition metadata consists of a URL for additional scripts to generate content for an individual partition.

5. The boot loader according to claim 4, wherein said additional scripts can further be used to update said partition metadata.

6. The boat loader according to claim 1, wherein said partition table script is downloaded from a remote server.

7. The boot loader according to claim 1, wherein said scripting engine supports security protocols to authenticate a remote server for downloaded data.

8. The boot loader according to claim 1, wherein said scripting engine supports security protocols to obfuscate the content of downloaded data.

9. The boot loader according to claim 1, wherein said scripting engine supports security protocols to authenticate the origin of downloaded data.

10. The boot loader according to claim 1, wherein said default script provides instructions to download said partition table script and generate said partition tables and said partitions upon every boot-up of said device, regardless of the status of any existing partition tables and partitions.

11. The boot loader according to claim 1, wherein said partition tables and said partitions are located in different units of physical memory on said device.

12. A method of booting a device, comprising:
   a) providing a boot loader, said boot loader having a script engine and an IP stack containing an address discovery service, a URL to IP address translator and one or more Internet file transfer protocols, that allow communication with a computer on a local or non-local network;
   b) reading and executing a default script to initialize said device, said default script including logic for verifying the integrity of any data and operating systems in memory on said device and wherein said default script includes the steps of:
   i) generating a primary partition table and a secondary partition table in memory on said device using a partition table script, said primary partition table and said secondary partition table being identical in content, and said content being partition metadata describing one or more partitions in memory on said device:
   ii) verifying said primary partition table and said secondary partition table against said partition table script;
   iii) generating said one or more partitions using said metadata on said primary partition; and
   iv) verifying said one or more partitions against said partition metadata.

13. The method according to claim 12, wherein said boot loader includes a user interface and including the additional step of checking for input from said user interface to interrupt said default script.

14. The method according to claim 12, wherein said partition metadata is a URL for a script to create content for each individual partition.

15. The method according to claim 12, wherein step b) returns to and repeats step a) in the event that validation of said partition tables fails.

16. The method according to claim 12, wherein step d) returns to and repeats step c) in the event that validation of said partitions fails.

17. The method according to claim 12, wherein said scripting engine supports security protocols to authenticate a remote server for downloaded data.

18. The method according to claim 12, wherein said scripting engine supports security protocols to obfuscate the content of downloaded data.

19. The method according to claim 12, wherein said scripting engine supports security protocols to authenticate the origin of downloaded data.

20. The method according to claim 12, wherein said default script provides instructions to download said partition table script and generate said partition tables and said partitions upon every boot of said device, regardless of the status of any existing partition tables and partitions.

21. The method according to claim 12, wherein said partition tables and said partitions are located in different units of physical memory on said device.

* * * * *